(12) United States Patent
Kauranen et al.

(10) Patent No.: US 12,466,101 B2
(45) Date of Patent: Nov. 11, 2025

(54) PLYWOOD PANEL REPAIRING SOLUTION

(71) Applicant: Raute Oyj, Nastola (FI)

(72) Inventors: Erkki Kauranen, Lahti (FI); Antti Mäkinen, Nastola (FI)

(73) Assignee: Raute Oyj, Nastola (FI)

( * ) Notice: Subject to any disclaimer, the term of this patent is extended or adjusted under 35 U.S.C. 154(b) by 1124 days.

(21) Appl. No.: 17/275,513

(22) PCT Filed: Jun. 7, 2019

(86) PCT No.: PCT/FI2019/050440
§ 371 (c)(1),
(2) Date: Mar. 11, 2021

(87) PCT Pub. No.: WO2020/053473
PCT Pub. Date: Mar. 19, 2020

(65) Prior Publication Data
US 2022/0118643 A1 Apr. 21, 2022

(30) Foreign Application Priority Data
Sep. 12, 2018 (FI) ..................... 20185760

(51) Int. Cl.
*B27D 5/00* (2006.01)
*B27G 1/00* (2006.01)
*G01N 21/898* (2006.01)

(52) U.S. Cl.
CPC ............ *B27D 5/00* (2013.01); *B27G 1/00* (2013.01); *G01N 21/898* (2013.01); *G01N 21/8986* (2013.01)

(58) Field of Classification Search
CPC .................... B27D 5/00; B27G 1/00
See application file for complete search history.

(56) References Cited

U.S. PATENT DOCUMENTS

| 3,452,791 A | 7/1969 | T. E, Jr. |
| 4,614,555 A * | 9/1986 | Smith et al. ............ B32B 35/00 156/64 |

(Continued)

FOREIGN PATENT DOCUMENTS

| AT | 1104202 U2 | 3/2010 |
| CN | 102159368 A | 8/2011 |

(Continued)

OTHER PUBLICATIONS

Search Report for Finnish U.S. Appl. No. 20/185,760 dated Apr. 8, 2019.

(Continued)

*Primary Examiner* — Matthew Katcoff
(74) *Attorney, Agent, or Firm* — Meunier Carlin & Curfman LLC

(57) ABSTRACT

The present invention relates to a system for repairing a plywood panel, the system comprising: at least one detection device for scanning the plywood panel; at least one repairing device for performing a repair operation for the plywood panel; a conveyor device for conveying the plywood panel; and a control device for generating at least one control signal to the conveyor device to halt the plywood panel in the system for performing a scanning operation of the plywood panel with the at least one detection device and to halt the plywood panel for performing a repairing operation with the at least one repairing device on the basis of information obtained with the detection device. Some aspects of the invention relate to a method for performing the repair operation.

10 Claims, 3 Drawing Sheets

(56) References Cited

U.S. PATENT DOCUMENTS

| | | | |
|---|---|---|---|
| 4,984,172 | A | 1/1991 | Luminari |
| 9,254,579 | B2 * | 2/2016 | Tolonen ............. G01N 21/8986 |
| 2014/0046471 | A1 | 2/2014 | Bamford et al. |

FOREIGN PATENT DOCUMENTS

| | | |
|---|---|---|
| CN | 104608215 A | 8/2016 |
| DE | 202008008428 U1 | 11/2009 |
| DE | 10223831 B4 | 12/2015 |
| DE | 102016101502 A1 | 8/2017 |
| EP | 0294038 A1 | 7/1988 |
| EP | 2337658 B1 | 12/1988 |
| JP | S5633404 U | 10/1981 |
| JP | S62114495 A | 5/1987 |
| JP | H01316149 A | 12/1989 |
| RU | 2565723 C2 | 10/2015 |
| SU | 1170978 A3 | 7/1985 |
| WO | 20091563882 A2 | 12/2009 |

OTHER PUBLICATIONS

International Search Report and Written Opinion for International Application No. PCT/FI2019/050440 dated Aug. 30, 2019.
Search report of Chinese patent application No. 2019800594369, issued Dec. 29, 2021, 3 pages.
Office Action relating to Russian Application No. 2021106239, dated Oct. 12, 2022.

* cited by examiner

PLYWOOD PANEL REPAIRING SOLUTION

CROSS-REFERENCE TO RELATED APPLICATIONS

This application is a national stage application filed under 35 U.S.C. § 371 of PCT/FI2019/050440 filed Jun. 7, 2019, which claims priority to and benefit of Finnish patent application serial number 20185760 filed Sep. 12, 2018, the contents of which are incorporated herein by reference in their entirety.

TECHNICAL FIELD

The invention concerns in general the technical field of a manufacturing of wood products. More particularly, the invention concerns a repairing of plywood products.

BACKGROUND

Manufacturing of plywood is a process comprising of a plurality of stages. In a big picture main stages are a preparation of veneer sheets from logs, preparation of plywood from the veneer sheets and a finalization of the plywood. The finalization of the plywood comprises a repairing phase in which a quality of the plywood is inspected and necessary measures to repair defects found during the inspection are taken. Some non-limiting examples of the defects are knots, knot holes, cracks, splits, color deviations and similar.

In prior art solutions the repair of the plywood panels is performed in a production line type repairing solution. There, the plywood panels are brought with a conveyor line to an inspection device which may e.g. scan the plywood panel in question, analyzes the scanned data and generates a repair command to at least one repair tool. The repair tool(s) performs an applicable repair operation to the defect of the plywood panel when the panel under repair advances in the production line and when the repair is performed the plywood panels may be collected at stacks at the end of the production i.e. repair line. This kind of approach is taken in a prior art document U.S. Pat. No. 4,984,172.

The drawback of the prior art solutions as described above is that the repairing lines according to prior art are expensive to acquire, but also expensive to use especially if all costs are taken into account. Part of the costs incur due to a need of a large floor area needed for establishing the repairing line. Moreover, an installation of the repairing line is difficult and challenging. Hence, there is need to develop alternative solutions for establishing the repairing of the wood panels which mitigate at least in part the above described drawbacks.

SUMMARY

The following presents a simplified summary in order to provide basic under-standing of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a system and a method for repairing at least one plywood panel.

The objectives of the invention are reached by a system and a method as de-fined by the respective independent claims.

According to a first aspect, a system for repairing a plywood panel is provided, the system comprising: at least one detection device for scanning the plywood panel; at least one repairing device for performing a repair operation for the plywood panel; a conveyor device for conveying the plywood panel; and a control device for generating at least one control signal to the conveyor device to halt the plywood panel in the system for performing a scanning operation of the plywood panel with the at least one detection device and to halt the plywood panel for performing a repairing operation with the at least one repairing device on the basis of information obtained with the detection device.

The at least one detection device may be arranged to move at least in part over the plywood panel under scanning.

Further, the at least one repairing device may be configured to perform the repair operation to the plywood panel at a same position as it is scanned with the at least one detection device.

The system may further comprise at least one holding device for holding the plywood panel. For example, the at least one holding device may e.g. be one of: at least one actuator equipped with a press foot; at least one actuator equipped with a suction cup. Still further, the actuator equipped with a suction cup may be arranged to operate on another side of the plywood panel to the at least one repairing device.

Moreover, the conveyor device may be arranged to perform at least one of the following: convey the plywood panel in the system, convey the plywood panel out from the system.

The system may further comprise at least one sensor for obtaining measurement data to determine a position of the plywood panel in the system. For example, the at least one sensor is one of: a photocell, an ultrasound sensor, a capacitive sensor.

According to a second aspect, a method for repairing at least one plywood panel is provided, the method comprising: receiving a plywood panel; scanning, by at least one detection device, the plywood panel in a first halted position; performing, by at least one repairing device, a repair operation to the plywood panel in a second halted position in response to a receipt of a control signal from a control device configured to generate the control signal to the at least one repairing device in response to a detection of a defect in the plywood panel on the basis of information obtained with the at least one detection device.

The control device may be arranged to generate a control signal to a conveyor device to halt the plywood panel.

The first halted position and the second halted position may be the same.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
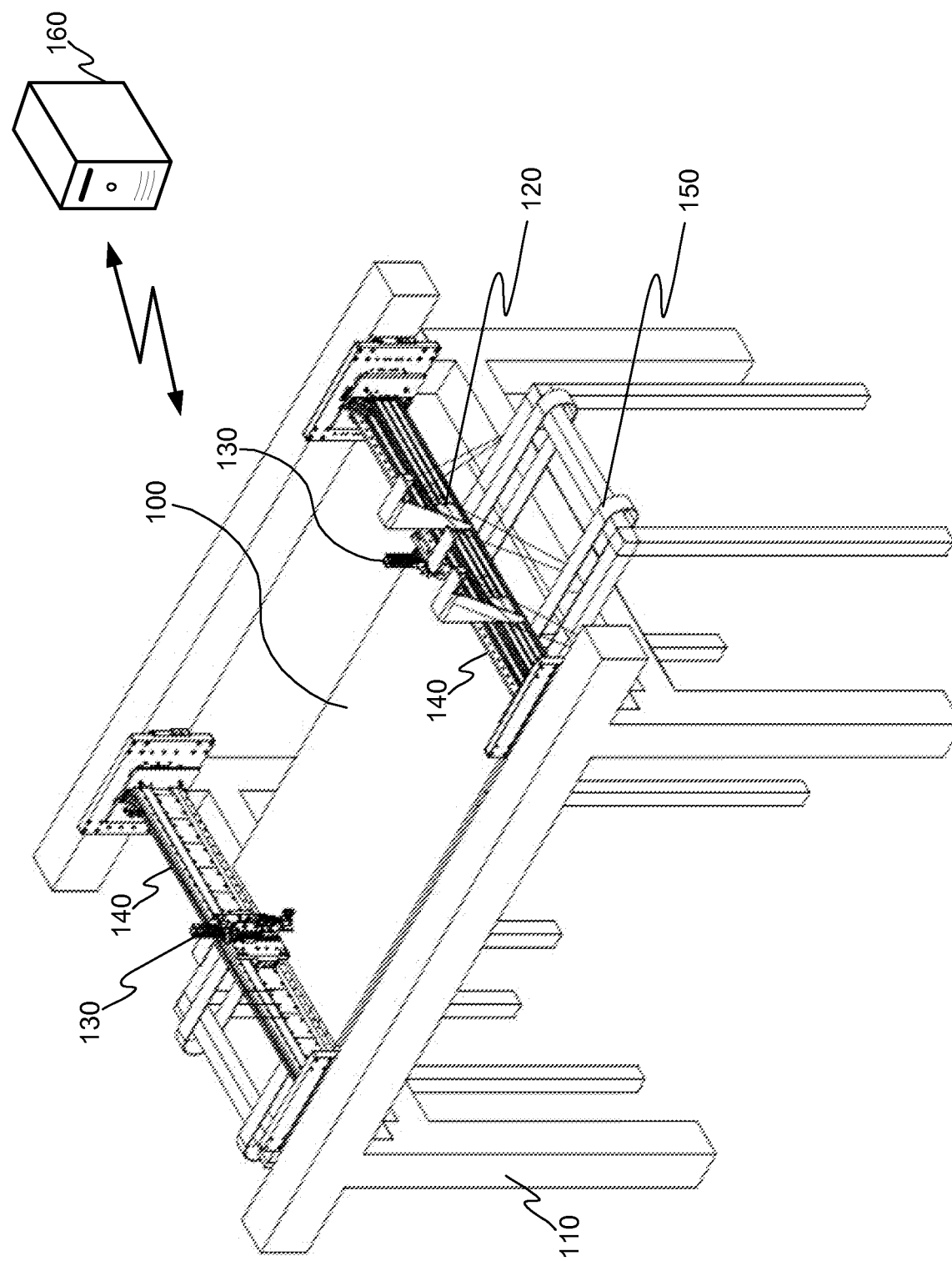
FIG. 1 illustrates schematically a plywood panel repairing system according to an embodiment of the invention.

FIG. 1 illustrates schematically a plywood panel 100 repairing system according to an embodiment of the invention. The plywood panel repairing system may refer to an entity comprising necessary devices for determining if a plywood panel 100 input to the system comprises a predetermined defect and necessary devices for performing at least one repair operation to the plywood panel 100 in case there is determined one or more predetermined defects. The system according to various embodiments may comprise a detection device 120 for scanning a plywood panel 100 in the system. By means of the detection device 120 the plywood panel 100 under processing may be scanned and by analyzing the data obtained by the scanning it may be determined if a repair operation shall be done with respect to the plywood panel 100 in question. A non-limiting example of an applicable detection device 120 may be an image capturing device, such as a camera, or a laser scanner aka. a laser profile sensor. The detection device 120 may be movably arranged in the frame structure 110 e.g. by means of a shaft 140 so that it may be arranged to travel at least in part over a plywood panel 100 under scanning for obtaining necessary information on the plywood panel 100. Furthermore, the system may comprise at least one repairing device 130 i.e. a tool by means of which at least some of the detected defects may be repaired. The non-limiting implementation as schematically illustrated in FIG. 1 comprises two repairing devices 130. The repairing device 130 may also be arranged to travel at least in part over the plywood panel 100 under repair e.g. with a similar kind of shaft 140 arrangement as the detection device 120. The repairing device 130 may e.g. comprise a tool for mechanically modifying the detected defect as well as a tool for inputting a substance to the defect or the modified defect. For example, the repairing device 130 may be a puttying device.

The repairing system may be configured to operate so that the plywood panel 100 under repair is scanned with the detection device 120 and the data generated by scanning is analyzed. In response to a detection that there is a predetermined defect in the plywood panel 100, a control signal may be generated to the repairing device 130 for performing the repair operation. As mentioned, the detection device 120 and the repairing device may be mounted on one or more shafts 140 e.g. extending over the conveyor device transversally to the operating direction of the conveyor device 150. The shafts 140 may be arranged to move along one or more rails arranged above the conveyor device 150 wherein the motion force may e.g. be generated with respective linear motors. In some other embodiments the shafts 140 may be arranged parallel to the operating direction of the conveyor device i.e. the scanning device 120 and the repairing device 130 operate transversally to the operating direction of the conveyor device 150 i.e. with respect to the direction of movement of the plywood panels 100. Moreover, at least some of the respective devices, i.e. the detection device 120 and the repairing device 130, may be mounted movably to the shaft 140 in question e.g. so that the a rail is arranged in the shaft 140 along which the device 120, 130 may be arranged to travel in order to position itself for the operation. In such an arrangement the device 120, 130 and/or the rail may be equipped with necessary motion generating devices, such as with applicable air engine or applicable linear motor or similar. Still further, the device 120, 130 itself may further comprise an actuator enabling a movement in a vertical direction e.g. in order to reach the plywood panel 100 for repairing operations.

Generally speaking, the system may comprise one or more shafts 140 arranged in the manner as described. The detection device 120 and the repairing device 130 may be arranged in own shafts 140 or the devices 120, 130 may be arranged in the same shaft 140 or in case the system comprises a plurality of at least one of the mentioned devices 120, 130 any combination of the shafts 140 as described may be applied to. In one advantageous embodiment the system is implemented so that in one shaft 140 two detection devices 120 are fixedly mounted and the same shaft 140 further comprises a repairing device 130 movably mounted in the shaft 140. Additionally, another repairing device 130 is movably mounted in another shaft 140. Such an implementation corresponds to the one as schematically illustrated in FIG. 1.

The overall control of the repairing system, and, hence, at least a control of the scanning operation, the analysis and the control of the repairing device 130 as well as a control of the conveyor device 150 may be executed by a control device 160, which may be communicatively, and operatively, coupled to the other entities belonging to the system. The communication between the entities and the control device 160 may be implemented either in a wired manner or wirelessly by applying known communication technologies, for example. Still further, in some embodiment the repairing system may comprise one or more holding devices by means of which the plywood panel 100 under repair may be held in place. This is important when the scanning operation is performed but also when the control signal for the repairing device 130 is generated in order to achieve the repairing device 130 to perform the repair operation in a correct position of the plywood panel 100. Moreover, holding the plywood panel 100 in place with the holding device or devices may be necessary during the repair operation. Advantageously both the scanning operation and the repair operation are performed to plywood panel 100 so that the panel remains exactly at the same position during these both operations. Alternatively or in addition, it may be arranged that the system is configured to monitor if the plywood panel 100 moves between the scanning operation and the repair operation and to determine an amount of the motion. In this manner it is possible to take into account the change in position for the generation of the control signals to the repairing device 130. A measurement of the change in position may be performed with any applicable measurement device or system. A non-limiting example of an applicable holding device may be an actuator equipped with a press foot, which may be arranged to hold the plywood panel 100 under repair under control of the control device 160 and to release the plywood panel 100 e.g. when the repair operation is ready.

As mentioned in the foregoing description, the invention according to various embodiments may further comprise a conveyor device 150 for conveying the plywood panel 100 in the system. The control device 160 may be arranged to control the operation of the conveyor device 150 e.g. in such a manner that the conveyor device is stopped so that the scanning and the repairing operations may be performed to a halted plywood panel 100. As mentioned above, in some embodiments the position of the plywood panel 100 in the scanning operation and the repairing operation within the system may differ from each other. Hence, the control device 160 may be arranged to generate a control signal to the conveyor device 150 to halt the plywood panel 100 in the system for performing a scanning operation of the plywood panel 100 with the detection device 120 and a repairing operation with the repairing device 130. The repairing operation may only be performed in response to a detection of a defect in the plywood panel 100 on the basis of information obtained with the detection device 120.

The conveyor device 150 itself may be a conveyor belt type solution comprising one or more belts. Width of the belt may be selected so that the overall operation of the system is confirmed. The plurality of belts may be arranged parallel to each other with an applicable distance to each other.

In the non-limiting example as schematically illustrated in FIG. 1 the system is implemented so that the shaft of the detection device 120 and the shaft of the repairing device 130 reside at different ends of the system in an idle state. Both of them may be arranged to travel along one or more rails arranged in the frame and above the conveyor device 150, wherein the motion force for moving the shafts along the rails may e.g. be generated with respective linear motors. In such an embodiment the operation of the detection device 120 and the repairing device 130 are consecutive to each other at least in part. In some other embodiments the detection device 120 and the repairing device 130 may be arranged to reside at the same end in the idle state i.e. both of them initiate their operation from the same end of the system. Advantageously, in such an embodiment dedicated rails may be arranged for both devices on the frame. The rails are arranged at different levels in a vertical direction so that the mentioned devices may pass vertically each other when operating. In such an embodiment operation of the detection device 120 and the repairing device 130 may also be consecutive to each other, but a concurrent operation may also be arranged. In the concurrent operating mode, there is need to arrange a monitoring of mutual positions of the device in order to avoid any conflict situation.

Figure 2:
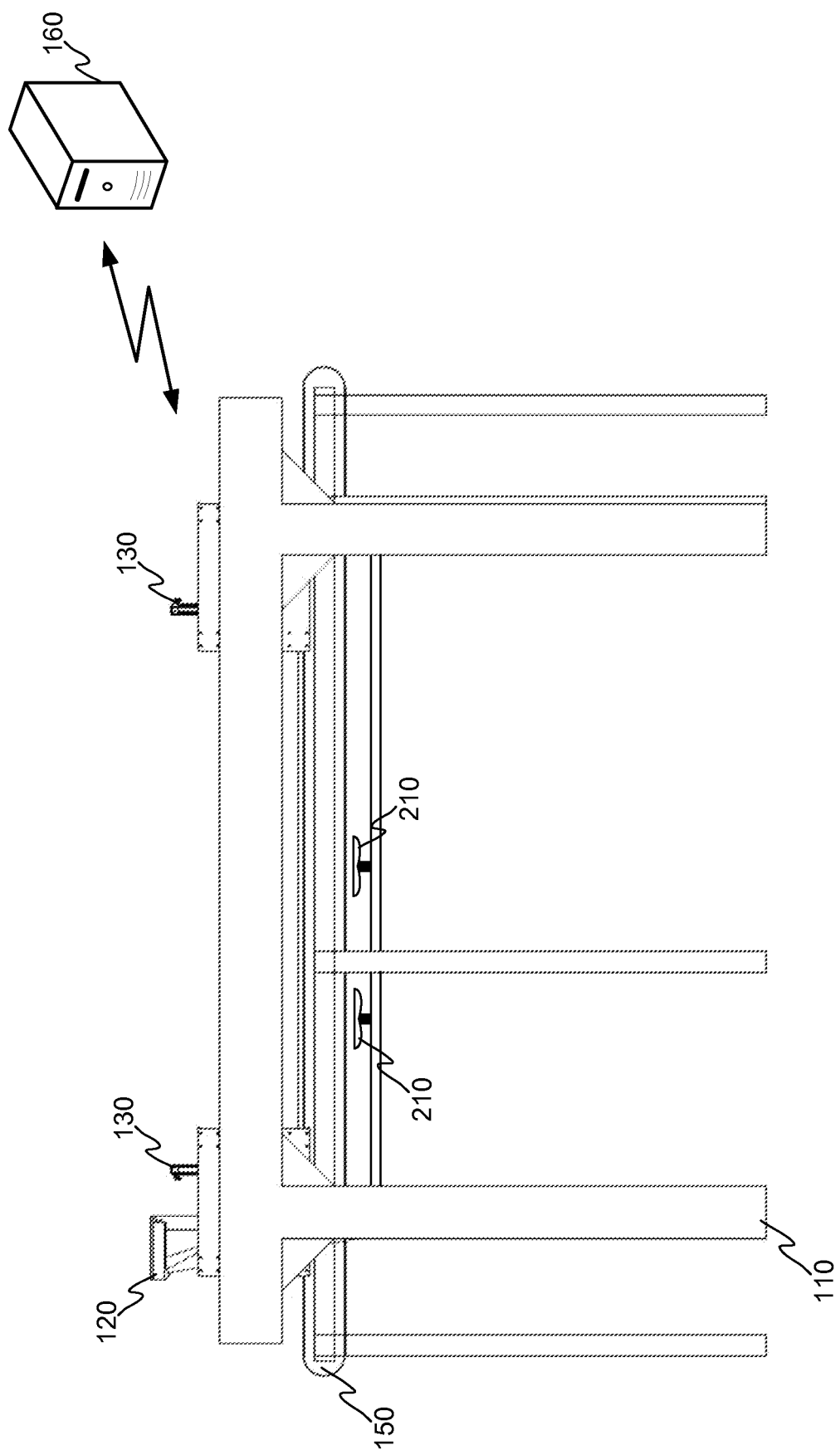
FIG. 2 illustrates schematically a plywood panel repairing system according to another embodiment of the invention.

FIG. 2 illustrates schematically an embodiment of the system as a side view disclosing further aspects of the system. Namely, as mentioned in various embodiments the system may comprise one or more holding devices for holding the plywood panel 100 still in at least some phases during the operation. As mentioned in the foregoing description an applicable holding device may e.g. be a press foot operating above the plywood panel and the one or more press foots may be controlled to push the plywood panel 100 against the conveyor device 150 in response to a need to hold the plywood panel 100 in place. In FIG. 2 it is disclosed another implementation for holding the plywood panel 100 in place. There the holding is arranged to be performed from the other side of the plywood panel residing on the conveyor device 150 than the repairing device 130 operates. The holding device 210 in such an embodiment may be such by means of which it is possible to grip the plywood panel 100 in question. An applicable type of holding device 210 may e.g. be an actuator equipped with a suction cup suit-able for gripping from the plywood panel 100. A number of the actuators may be selected in accordance of a need. In some embodiments of the invention the holding device 210 comprising an actuator equipped with the suction cup may be controlled so that first the repairing device 130 is controlled to push the plywood panel 100 against the conveyor device 150 and then with holding device 210 is controlled to grip the plywood panel 100 from the other side. In other words, the push by the repairing device 130 generates a counter-force from a first side of the plywood panel 100 for enabling the gripping with the holding device 210 from the other side of the plywood panel 100. The gripping in the described manner may be arranged prior to scanning, and at least prior to repairing operation. The one or more holding devices 210 may be arranged movably e.g. by applying an air engine as an actuator for allowing a movement of the holding device 210 at least in vertical direction. In various embodiments of the invention a plurality of the holding devices 210 equipped with the suction cups may be arranged in the same body whose vertical direction may e.g. be controlled with the air engine. In case the holding device 210 needs to be moved in any horizontal direction a rail implementation with linear motor arrangement as with the detection device 120 and the repairing device 130 may be applied. The holding device 210 as described may also be based on vacuum suction with a suction cup and other necessary equipment. Naturally, the control of the one or more holding device 210 may also be performed by the control device 160.

Generally speaking, the present invention does not limit anyhow an input of the plywood panel 100 in the system. According to various embodiments the conveyor device 150 may be arranged in such a manner that in runs over a size of the cell itself i.e. the same conveyor device 150 arrange to convey the plywood panel 100 in the system may extend so that it also brings the plywood panel 100 in the system and/or conveys it out from the system. Alternatively, the conveyor device 150 may only operate in the system and there is another conveyor device, or transport device, arranged to input the plywood panel 100 to the conveyor device 150 of the system. Similar arrangement may be established in the output side of the system. Still further, the plywood panels 100 may be input and output to and from the system with other transport devices applicable to the task with the present invention.

Figure 3:
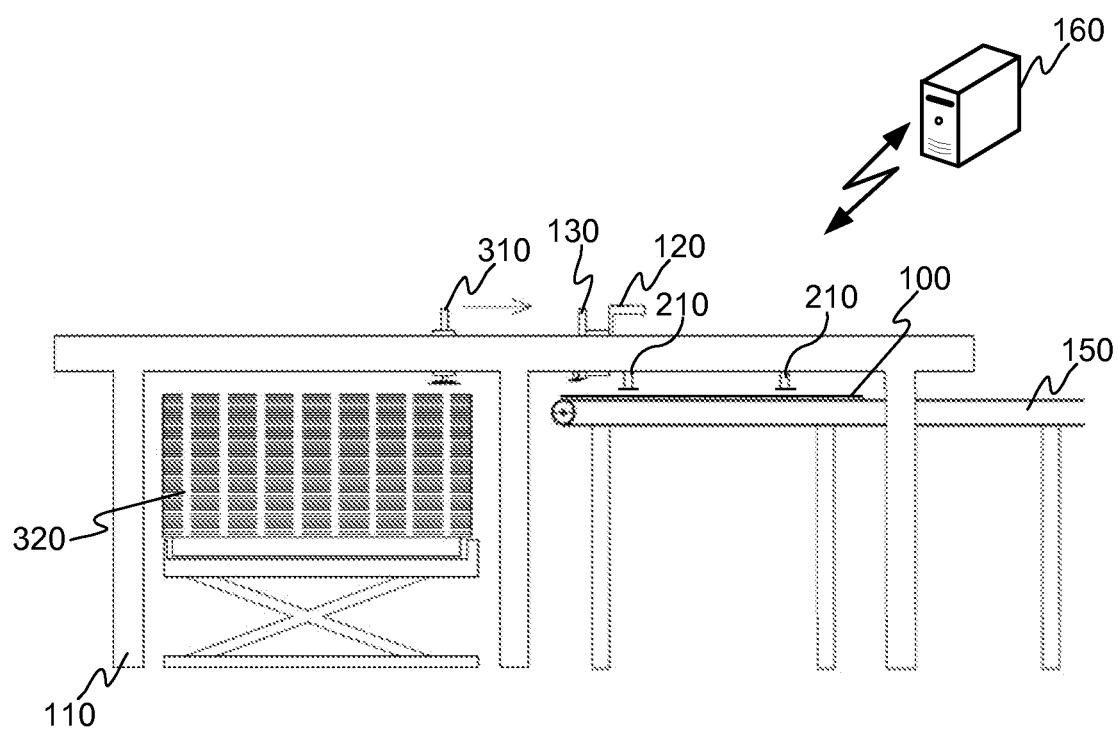
FIG. 3 illustrates schematically a plywood panel repairing system according to still further embodiment of the invention.

For example, in FIG. 3 it is schematically illustrated, as a non-limiting example of the invention, an embodiment in which plywood panels 100 are brought to the system according to the present invention from input section. In the non-limiting example, the plywood panels 100 may be brought as a stack 320 in the input section wherein a transport device 310 is arranged to pick up at least one top-most plywood panel 100 from the stack 320 and transport it to the system according to the invention. More specifically, the transport device 310 may be arranged to transport the plywood panel 100 so that it is positioned on the conveyor device 150, such as on a belt of the conveyor device 150. The system may be arranged to detect this e.g. with one or more sensors and to convey the plywood panel 100 to a scanning position. The scanning may be performed with the detection device 120 and the repairing operation with the repairing device 130. As mentioned, the plywood panel 100 under scanning and under repairing is halted during the respective operation by controlling an operation of the conveyor device 150. As discussed, the system according to various embodiments may comprise holding devices 210 for holding the plywood panel 100 e.g. during the scanning and/or during the repairing. In the embodiment depicted in FIG. 3 the holding devices 210 are press foots. The non-limiting example of the invention as schematically depicted in FIG. 3 is implemented so that a common frame structure 110 is arranged both for the input section, i.e. the stack side, and to the system according to the invention. However, the frame structure 110 may be separate for each of the entities as long as the transport of the plywood panels 100 is arranged in some manner. The conveyor device 150 in the embodiment of FIG. 3 is implemented so that int conveys the plywood panel 100 out from the system, but other arrangements may also be used.

For sake of clarity, the transport device 310 may be implemented with a device having a plurality of gripping devices by means of which the plywood panel 100 to be transported may be gripped. The gripper devices may be such that they may move in a vertical direction for reaching the plywood panel and have means, such as vacuum suction or vacuum cup (cf. suction cup), to grip the object in question. Moreover, the implementation of the transport device 160 may be based on rails mounted on the frame structure 110 along which rails the transport device 310 may be caused to travel. The transport device 310 comprises a motion generation device, such as a linear electric motor, for generating a force causing the motion of the transport device 310 for achieving the transport of the plywood panel. In other words, the transport device 310 may be controlled to transport a plywood panel 100 between the input section and the system, typically from the input section A to the system and release the transported plywood panel 100 there.

The invention according to various embodiments may comprise one or more sensors by means of which it is possible to monitor a position of a plywood panel 100 in the system and based on the sensor data a control unit may generate one or more control signals to control an operation of the conveyor device 150.

In various embodiments of the invention the detection device 120 may be used for deriving the position data. Alternatively or in addition, it is possible to arrange further sensors, such as photocells like infrared based sensors, to e.g. detect at least one edge of the plywood panel 100 when it is conveyed with the conveyor device 150 and control the operation of the conveyor device 150 on the basis of the detections with the sensor data. Other applicable sensor types may e.g. be ultrasound sensors or capacitive sensors. The operation with the sensors may be implemented so that it is detected when the signal between a transmitter and a receiver of the sensor is blocked by the plywood panel 100, or any other predetermined element representing a position of the plywood panel 100, and based on the detection a control signal for controlling the conveyor device 150 may be generated. Various further implementations may be established, such as in case of a plurality of sensors a common value, such as an average value, of the detection representing the position may be generated and used in the control of the conveyor device 150.

The system as described above may, thus, be configured to perform a method for repairing at least one plywood panel 100 in which at least one plywood panel 100 is received in the system. The plywood panel 100 may e.g. be received via a conveyor device Moreover, in the method at least one plywood panel 100, typically all the plywood panels, entering the system, may be scanned with a detection device 120 in the system and a repair operation may be performed, with a repairing device 130, to a plywood panel 100 in response to a receipt of a control signal from a control device 160, which is configured to generate the control signal to the repairing device 120 in response to a detection of a defect in the plywood panel 100. The detection of the defect may be performed on the basis of information obtained with the detection device 120 from a halted plywood panel 100 during scanning, e.g. through analyzing the obtained information. The method may also comprise a step in which the control device 160 generates a control signal for halting the conveyor device 150 in accordance to a detection that the plywood panel 100 resides in a scanning position. Alternatively, the control device 160 may be arranged to generate a control signal for moving the plywood panel 100 a predetermined distance in the system and halt the plywood panel 100 in another position to perform the repairing operation, as discussed in the foregoing description. Further aspects relating to the method may have been described in the description of the system.

As becomes clear from the description above the present invention relates to a system by means of which it is possible to repair plywood panels. The repair comprises at least a detection operation and a repairing operation. The system comprises necessary entities, such as devices and/or functionalities to perform the repairing. Even if the entity configured to perform the repairing is called as a system in the description herein it may also be understood as a device comprising necessary elements and entities, as described, for performing the repairing of the plywood panels.

In addition to the advantage of enabling a compact size plywood panel repairing system with the present invention further advantages may be gained with idea to halt the plywood panel 100 for at least some of the operations. Namely, by halting the plywood panel 100 for scanning improves a quality of the captured image and, hence, a detection of defects may be improved. Especially, if the plywood panel 100 is held still between the scanning operation and the repairing operation an accuracy of the repairing may be remarkably improved. As a result, the quality of the repaired plywood panel is high and a consumption of the repairing substance, such as a putty, may be optimized. Even if the plywood panel 100 is moved a manageable distance between the scanning operation and the repairing operation the same advantages may be substantially achieved. Compared to existing solutions in which the plywood panels travel along the conveyor device wherein the plywood panels may change their position the advantages of the present invention are remarkable.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A system for repairing a plywood panel, the system comprising:
   at least one detection device for scanning the plywood panel, the at least one detection device comprising one of an image capturing device or a laser profile sensor, wherein the at least one detection device is arranged to move at least in part over the plywood panel under scanning, at least one repairing device configured to apply a repairing substance for performing a repair operation for the plywood panel, a conveyor device comprising at least one conveyor belt for conveying the plywood panel, and a control device operatively coupled to and in communication with each of the conveyor device, the at least one repairing device, and the at least one detection device, the control device configured to generate at least one control signal to the conveyor device to halt the plywood panel in the system for performing a scanning operation of the plywood panel with the at least one detection device and to halt the plywood panel for performing a repairing operation with the at least one repairing device on the basis of information obtained with the at least one detection device.

2. The system of claim 1, wherein the at least one repairing device is configured to perform the repair operation to the plywood panel at a same position as it is scanned with the at least one detection device.

3. The system of claim 1, the system further comprising at least one holding device for holding the plywood panel.

4. The system of claim 3, wherein the at least one holding device is one of: at least one actuator equipped with a press foot or at least one actuator equipped with a suction cup.

5. The system of claim 4, wherein the at least one holding device is the at least one actuator equipped with a suction cup, the at least one actuator is arranged to operate on another side of the plywood panel than the at least one repairing device.

6. The system of claim 1, wherein the conveyor device is arranged to convey the plywood panel in the system and/or convey the plywood panel out from the system.

7. The system of claim 1, the system further comprising at least one sensor for obtaining measurement data to determine a position of the plywood panel in the system.

8. The system of claim 7, wherein the at least one sensor is one of: a photocell, an ultrasound sensor, a capacitive sensor.

9. The system of claim 4, wherein the at least one repairing device is arranged to push the plywood panel against the conveyor device and in response to the pushing the at least one actuator equipped with the suction cup is arranged to grip the plywood panel from the other side.

10. The system of claim 1, wherein the at least one repairing device further comprises:
- a tool for mechanically modifying a detected defect on the plywood panel, the tool configured for forming a modified defect; and
- a puttying device for applying the repairing substance to the modified defect, wherein the repairing substance is a putty.

* * * * *